United States Patent [19]

Brännström

[11] Patent Number: 4,530,207
[45] Date of Patent: Jul. 23, 1985

[54] POWER PLANT WITH A FLUIDIZED BED COMBUSTION CHAMBER

[75] Inventor: Roine Brännström, Finspong, Sweden

[73] Assignee: ASEA-STAL AB, Sweden

[21] Appl. No.: 602,579

[22] Filed: Apr. 20, 1984

[30] Foreign Application Priority Data

May 5, 1983 [SE] Sweden .............................. 8302572
Aug. 23, 1983 [SE] Sweden .............................. 8304558

[51] Int. Cl.³ .............................................. F02C 3/26
[52] U.S. Cl. ................................. 60/39.464; 110/263
[58] Field of Search ............... 60/39.12, 39.464; 110/244, 263, 347; 122/4 D; 431/7, 170

[56] References Cited

U.S. PATENT DOCUMENTS

| 2,718,754 | 6/1951 | Lewis . | |
|---|---|---|---|
| 3,659,559 | 5/1972 | Foldes et al. | 122/4 D |
| 3,807,090 | 12/1972 | Moss . | |
| 4,080,784 | 3/1978 | Jubb | 60/39.464 |
| 4,084,545 | 4/1978 | Nack et al. | 110/245 |
| 4,103,646 | 8/1978 | Yerushalmi et al. | 110/263 |
| 4,419,965 | 12/1983 | Garcia-Mallol et al. | 110/263 |

FOREIGN PATENT DOCUMENTS 0003117 8/1971 European Pat. Off. .
3004847 12/1982 Fed. Rep. of Germany .
1542862 2/1976 United Kingdom .

Primary Examiner—Louis J. Casaregola
Attorney, Agent, or Firm—Pollock, Vande Sande & Priddy

[57] ABSTRACT

A power plant with a combustion chamber (8) with a fluidized bed (14) and a device for adjusting the bed height, comprising a storage container (21) for bed material, the storage container (21) being connected to the combustion chamber (8) by a first conduit (22) for feeding out bed compound from the combustion chamber (8) to the container (21) and a second conduit (23) for returning bed compound from the container (21) to the combustion chamber (8). The storage container (21) is connected, via a conduit (34) with a valve, to a space having lower pressure than the pressure in the combustion chamber (8). The return conduit (23) is connected, via a conduit (67) with a valve, to a pressure gas source (10) having higher pressure than the pressure in the combustion chamber (8). Transport of bed compound from the combustion chamber (8) is achieved by reducing the pressure in the storage container (21). Return transport of bed compound to the combustion chamber (8) is brought about by supplying transport gas to the return conduit (23).

19 Claims, 9 Drawing Figures

POWER PLANT WITH A FLUIDIZED BED COMBUSTION CHAMBER

The present invention relates to a power plant with a fluidized bed combustion chamber for combustion of a supplied fuel and with devices for adjusting the bed height in dependence on the operating conditions by transferring bed material from the combustion chamber to a storage container and returning this bed material to the combustion chamber. It is particularly intended for plants with combustion in a pressurized fluidized bed in a combustion chamber located in a pressure vessel (a PFBC plant).

In a PFBC plant a gas and a steam cycle are often combined. Both propellant gas for gas turbines and steam for steam turbines are generated in a common combustion chamber. The total efficiency can be increased, solid fuels may advantageously be used and environmentally harmful products, for example sulphur, can be efficiently absorbed.

The bed height must be adjusted to obtain the desired output power, and bed compound must thereby be removed from or returned to the combustion chamber. Because of the high temperature of the bed compound, 750°–900° C., and other properties, the handling involves problems which are difficult to solve.

The problems and the state of the art as regards means for handling bed material in plants with fluidized bed combustion chambers are presented in detail in a report, ANL/CEN/FE-81-3, from Argonne National Laboratories, Argonne, Ill., "Discharge and Handling of Solids from Pressurized Fluidized Bed Combusters" by John E. Hanway Jr. and W. F. Podolski.

The invention aims to provide a simple and reliable equipment with no movable parts in direct contact with the hot erosive material for adjusting the bed level in a combustion chamber by transferring the bed material to a storage container and returning it to the combustion chamber.

According to the invention, at least one storage container is connected to the combustion chamber by two separate conduits, one feeding-out conduit for transferring bed material from the combustion chamber to the storage container, and another conduit for returning the bed material to the combustion chamber. The storage container is connected, by way of a conduit with a valve, to a space having lower pressure than that of the combustion chamber. In this way a pressure difference can be achieved which results in the fluidized bed compound flowing over from the combustion chamber to the storage container. The return conduit is connected, by way of another conduit with a valve, to a pressure gas source having a higher pressure than that of the combustion chamber. By supplying pressure gas to the return conduit, return transport of bed compound to the combustion chamber is achieved. In a PFBC plant, the storage container is suitably positioned in the same pressure vessel as the combustion chamber. It then only needs to be dimensioned for a relatively insignificant pressure difference.

The outlet end of the feeding-out conduit opens out either into a dust separator (e.g. a cyclone) located above the storage container, or directly into said container. In the former case, bed compound is separated from transport gas and falls down into the storage container. In the latter case, bed compound is separated from gas in the storage container, and the transport gas is possibly cleaned in some cleaning device before being forwarded to a turbine or to the atmosphere. The outlet end of the feeding-out device is suitably inserted substantially vertically at the top of the storage container and terminates at a level corresponding to maximum level of filling. This results in an automatically operating level control, since the transport is interrupted when bed compound reaches the tube orifice. The effect is improved if the tube is provided with openings in the tube wall above the orifice. Fluidization of the uppermost layer of the bed compound is then avoided and the transport is interrupted at a well-defined level.

In one embodiment of the invention, the feeding-out conduit is provided with a fluidizing device at its inlet. In this way the desired supply of air can be achieved with regard to a favourable material transport. The relationship between bed compound and transport gas may be adjusted so that the desired capacity can be attained.

According to the invention, the return conduit is formed with a valve or so as to constitute a material lock, preventing unintentional feedback of bed compound. The conduit can be formed with a so-called L-valve or other type of fluid valve. This is suitably located at the lower part of the combustion chamber. The valve communicates through said conduit with a pressure gas source having a higher pressure than that of the combustion chamber. By supplying gas to the L-valve, return transport of bed compound to the combustion chamber is obtained. The pressure vessel may, for example, serve as a pressure medium source. Possibly, the pressure may be increased by a booster compressor.

The invention will be described in greater detail with reference to the accompanying drawings, wherein FIGS. 1 and 2 schematically show two different embodiments of a power plant with a combustion chamber enclosed within a pressure vessel;

Figure 1:
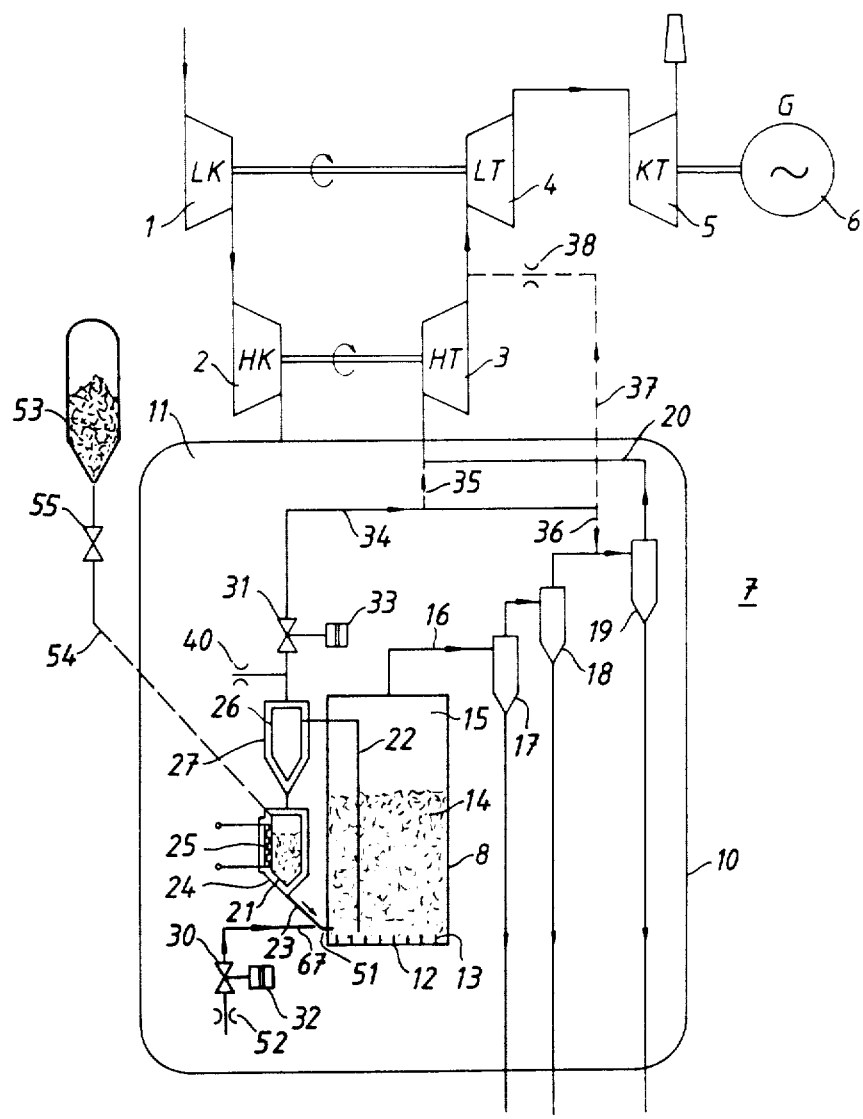
Figure 2:
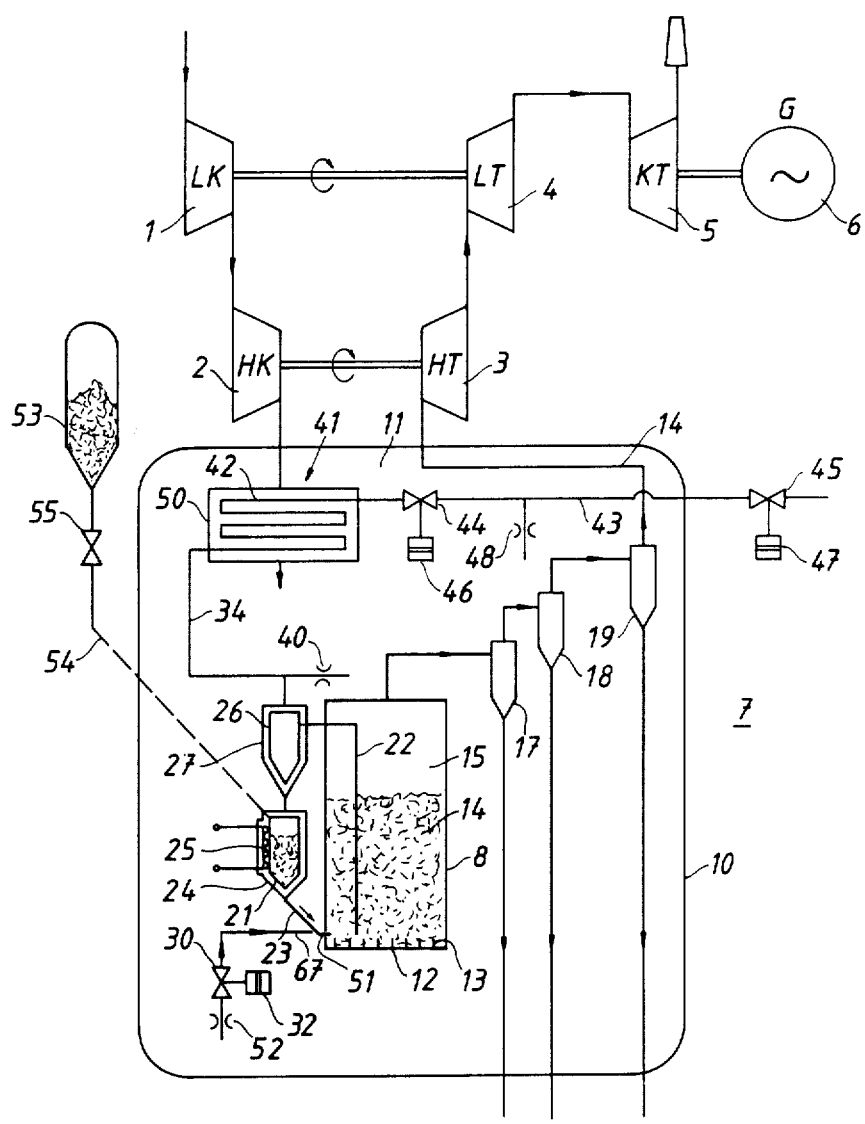

As shown in FIGS. 1 and 2, the power plant includes a low-pressure compressor 1, a high-pressure compressor 2, a high-pressure turbine 3, a low-pressure turbine 4 and a power turbine 5 driving a generator 6. The embodiment is a conventional three shaft device having the low-pressure and high-pressure portions and the power turbine and the generator on separate shafts, and shows only one of several possible arrangements and only serves as an example.

Normally, there is also included a steam turbine driving a generator which is driven by steam generated in tubes in the fluidized bed in the combustion chamber. However, this is not shown.

The turbines 3, 4 and 5 receive their energy from a combustion chamber plant 7 having a combustion chamber 8 in a pressure vessel 10, i.e. a so-called PFBC plant. The compressors 1 and 2 feed the space 11 in the pressure vessel 10 with compressed air. The combustion chamber 8 is provided with a bottom 12 with nozzles 13, through which the bed 14 of particulate material is supplied with air for fluidization of the bed and for combustion of fuel supplied to the bed. The fuel is fed into the bed through a fuel system of a known kind (not shown). Hot combustion gases generated in the bed 14 are collected in the freeboard 15 of the combustion chamber 8 and leave the combustion chamber 8 through the conduit 16 and are cleaned in cyclones 17, 18 and 19, whereafter they are passed to the high-pressure turbine 3 through the conduit 20. Ashes separated in the cyclones, and other dust from the bed, are fed out from the cyclones in a known manner, for example through an ash discharge device of the kind described in more detail in Swedish patent application No. 8205748-0 (corresponding to U.S. patent application Ser. No. 445,635, filed Nov. 30, 1982; inventor R Brännstroöm). The figures show a group of series-connected cyclones; in reality there are a number of parallel-connected such groups.

In a power plant of the above kind, the output power is changed by, among other things, varying the bed height. To this end, there is or are one or more containers 21 inside the pressure vessel 10 adjacent or above the combustion chamber 8, in which temporarily redundant bed material can be stored. This storage container 21 is connected to the combustion chamber 8 through two conduits 22 and 23 for feeding out material from the bed 14 to the storage container and for return transport of bed material from the storage container 21 to the combustion chamber 8. To ensure equilibrium so that unintentional conveyance of bed material between the combustion chamber 8 and the storage container 21 is prevented, the pressure at the orifices should be substantially equal. This can be achieved, for example, by locating the orifices at the same level above the bottom 12 of the combustion chamber 8. The storage container 21 is suitably located inside the pressure vessel 10. The pressure difference between the outlet and inlet sides of the storage container 21 will then be small, which entails low mechanical stresses thereon. However, there is, in principle, nothing preventing a location outside the pressure vessel 10, but such a location implies that the container 21 will have to be designed for the same high pressure as the pressure vessel 10. The storage container 21 is suitably insulated and, as shown, surrounded by a thermal insulating casing 24 and provided with a heater 25, which may be of electrical type, for keeping the bed compound hot during storage. Because of such heat retaining, disturbances in the combustion and bed temperature decrease are avoided when feeding in large amounts of bed material.

Figure 5:
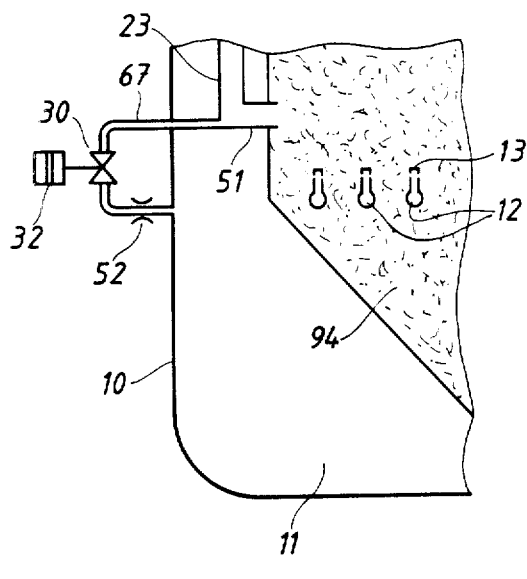
FIG. 5 shows an example of the embodiment of the return feed tube at the point of connection to the combustion chamber.
Figure 5A:
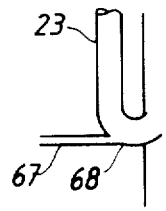
FIGS. 5a, 5b, 5c and 5d show alternative embodiments of this connection.
Figure 5B:
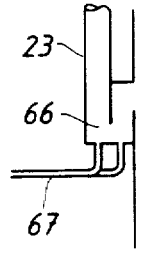

In the embodiment according to FIGS. 1 and 2, there is a cyclone separator 26, which is also provided with a thermal insulating layer 27. The upstream end of the feeding-out conduit 22 is situated in or at the lower portion of the bed 14 immediately above the bottom 12 of the combustion chamber 8 and is connected to the cyclone 26 where propellant gas is separated from bed material, which falls down into the storage container 21. The return conduit 23 also opens out immediately above the bottom 12. At the orifice in the bed 14, it is formed as a material valve which prevents the bed material from flowing, without the aid of transport gas, from the container 21 to the combustion chamber 8. The orifice portion can suitably be formed as an L-valve, as shown in FIG. 5, or alternatively as a J-valve, as shown in FIG. 5a, or as a U-valve, as shown in FIG. 5b. With these embodiments, an efficient and reliable valve function is obtained without the aid of movable valve parts such as slides, valve discs or the like. In view of the high temperature of the bed material, 750°-900° C., the absence of movable valve parts in direct contact with the material is of extremely great value.

Figure 3:
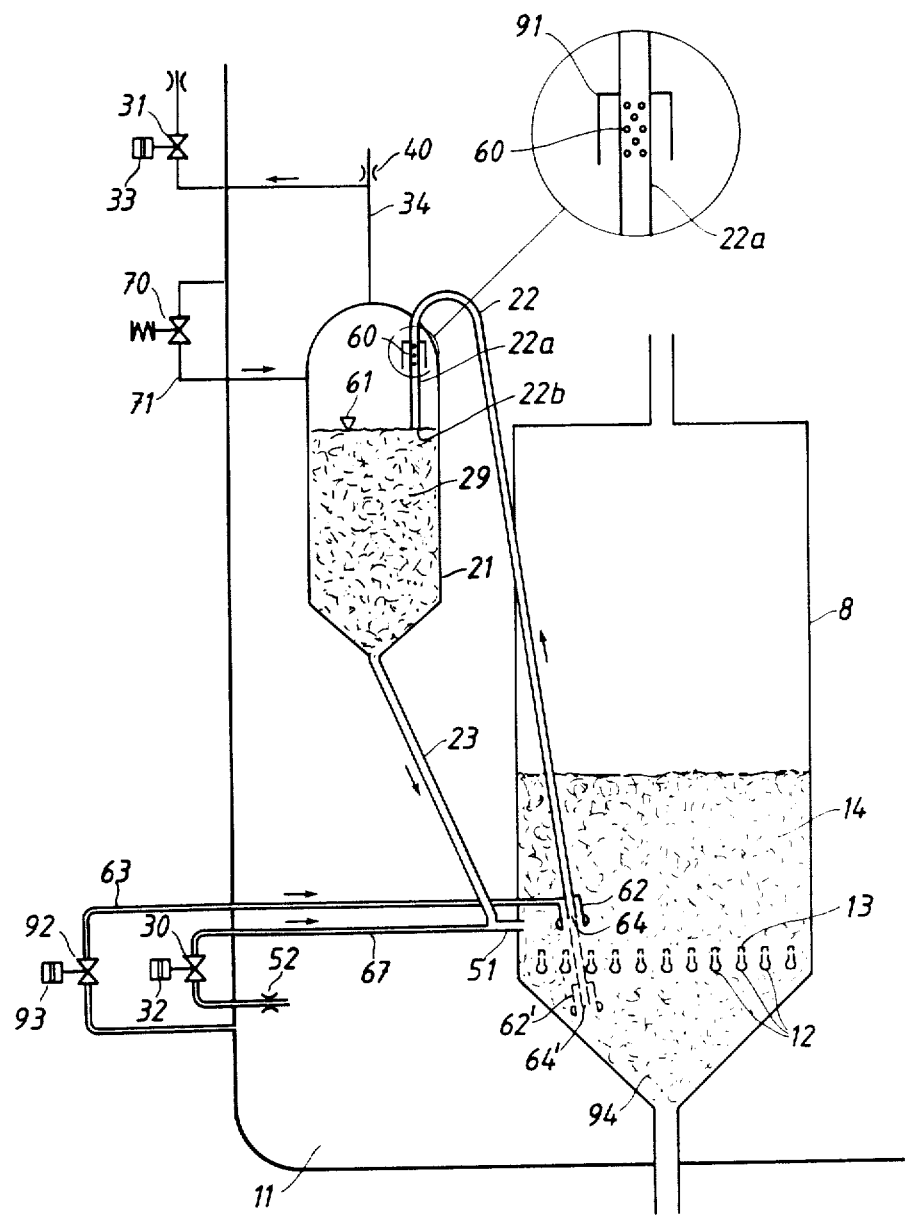
FIG. 3 shows an alternative embodiment of the plant portion for adjusting the bed height.
Figure 4:
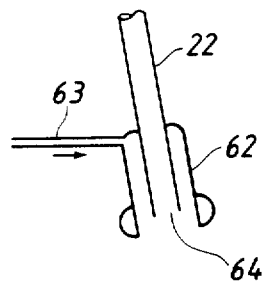
FIG. 4 shows an embodiment of the inlet part of the feeding-out tube.

The control of the material transport between the combustion chamber 8 and the storage container 21, in the embodiment according to FIG. 1, is performed by two valves 30 and 31 with associated actuators 32 and 33. These valves may be continuously regulating or of off-on type. In the shown embodiment, said actuators are positioned inside the pressure vessel 10, but with respect to accessibility and service they are suitably located outside the pressure vessel 10, as shown in FIGS. 3 and 5. Feeding out of bed material from the bed 14 through the conduit 22 is achieved through reduction of the pressure in the cyclone 26 and/or the storage container 21 by opening the valve 31 so as to obtain communication with a space having lower pressure than that of the combustion chamber 8. Through the conduits 34, 35, the cyclone 26 and thus the storage container 21 can be directly connected to the high-pressure turbine 3, or through the conduits 34, 36 to any of the cyclones 17, 18, 19, or through the conduits 34, 37 to the low-pressure turbine 4. In the latter case, it may be suitable to restrict the gas flow by means of a throttle means 38, for example in the conduit 37. The conduit 34 communicates, between the cyclone 26 and the valve 31, with the space 11 in the pressure vessel 10 via a throttle means 40. In the event of a leakage flow through the valve 31 due to incomplete sealing, the air flow through the throttle means 40 serves as sealing air which prevents hot gas and erosive material from the combustion chamber 8 from leaking out through the valve and causing heavy heat losses or damage to the valve.

The transport gas can also be conducted to the atmosphere outside the pressure vessel 10, either directly or, as shown in FIG. 2, through a cooler 41 connected to the conduit 34, which cooler may also constitute a flow-restricting throttle means. This cooler 41 may be designed according to the same principles as the ash discharge device disclosed in U.S. patent application Ser. No. 445,635. On the inlet side, its tubes 42 are connected to the conduit 34 and on the outlet side to a conduit 43 which opens out into a suitable space outside the pressure vessel 10, which is under lower pressure, for example atmospheric pressure. The conduit 43 includes two valves 44 and 45, arranged in series one after the other, which are operated by operating devices 46 and 47, respectively. These valves may be continuously regulating or of off-on type. These valves correspond to the valve 31 in FIG. 1. Between the valves 44 and 45, the conduit 43 communicates with the space 11 via a throttle means 48. When the transport of bed compound from the combustion chamber 8 to the storage container 21 is to be interrupted, the valve 44 is first closed and then the valve 45. When the latter valve 45 is closed, it is traversed by clean air from the space 11, and therefore the chances of a complete seal are improved. In the event of a leakage of the valve 44, only clean air having a low temperature will flow through said valve to the combustion chamber 8, where it is utilized. In the event of leakage of the valve 45 as well, gas and erosive material from the bed are prevented from reaching the valve 45. The cooler 41, consisting of tube parts 42, is enclosed within a casing 50 which controls the air flow from the compressor 2 past the tube parts 42 on its way to the space 11, thus obtaining good cooling of the transport gas. By using the cooler 41, the heat in the transport gases may be utilized while at the same time inexpensive valves 44, 45 designed for low temperatures can be used. Suitably, also the valve 44 is positioned outside the pressure vessel 10, in view of the accessibility for service.

Feedback of material from the storage container 21 to the combustion chamber 8 takes place via the tube 23 by means of transport air from the space 11, which is supplied to the end 51 of the conduit 23, which end is formed as an L-valve 51. The regulation of the return feed is performed by means of the valve 30. This may be of an off-on type in combination with a flow-restricting throttle means 52, or a continuously controllable valve, whereby the material flow in the conduit 23 increases with increasing air flow through the valve 30. The storage container 21 communicates with a second storage container 53 with additional bed material via a conduit 54 and a valve 55. From this latter container 53, new bed material can be supplied, when necessary, to the container 21.

FIG. 3 shows an alternative embodiment having the discharge tube 22 opening out directly into the storage container 21. The tube end 22a opening into the container 21 is downwardly directed. By this embodiment, a locking action is obtained which automatically interrupts transfer of bed compound when the level in the container 21 reaches the tube orifice 22b. The tube end 22a may be provided with openings 60 at some distance above the orifice 22b. The outflow of gas therethrough provides an improved lock and stop function so that the transport of bed compound is interrupted at the same position of the surface 61 of the bed material irrespective of the pressure difference between the combustion chamber 8 and the container. By applying a skirt 91 around the tube part 22a with the openings 60, the function can be further improved.

In the embodiment shown in FIG. 3, the inlet opening 64 of the conduit 22 is surrounded by a sleeve 62, which can be supplied with air from the space 11 in the pressure vessel 10 via the conduit 63 with the valve 92 which is operated by the actuator 93. The valve 92 may be continuously regulating or of off-on type. The purpose of air supply at the inlet opening of the tube 22 is to bring about an active fluidization and air supply and thus a suitable ratio between bed material and transport air in the conduit 22. In this way, the flow of material can be regulated within wide limits and be adjusted so as to obtain the desired flow at a certain pressure difference between the combustion chamber 8 and the storage container 21. Upon an increasing air flow through the valve 92, the material flow in the tube 22 is reduced. In the embodiment according to FIG. 3, the inlet opening 64 is placed in the bed and above the fluidization bottom 12 of the combustion chamber 8 and at the same level as the L-valve 51. In the shown embodiment with a bottom which is capable of admitting bed material (often called sparge distributor plate), the orifice may also be positioned in the space 94 below the bottom 12, as shown in dashed lines (62' and 64') or in the wall of the combustion chamber 8. An embodiment with a sleeve 62 which is supplied with air for fluidization of bed compound and addition of transport air at the tube orifice is, in this case, necessary to obtain a good function.

Figure 5C:
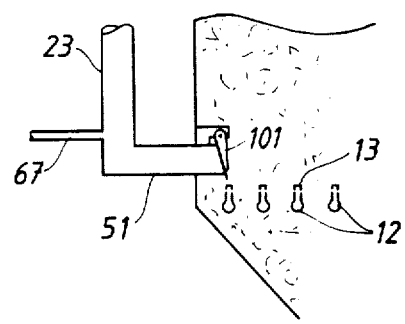

As mentioned, return feed of the bed compound is achieved through the return feed conduit 23. Air from the space 11 in the pressure vessel 10 is supplied to an L-valve 51 or to other valves 68, 66 according to FIGS. 5, 5a, 5b, 5c and 5d so that bed compound present in the valves is fluidized and set in motion. The tubes 67, which conduct air to the valves, are suitably connected to the lower portion of said valves, as shown in the figures. At the outlet of the return feed conduit 23 into the combustion chamber there may possibly be an easily movable valve clack 101 which, between the bed material transport occasions, prevents gas from flowing from the combustion chamber to the storage container. Such a valve clack is shown in FIG. 5c.

When burning fuel with a low reactivity (for example, certain types of coal) or fuel with a great particle size distribution, it may occur that the proportion of coal in the bed compound becomes relatively large (1–3%). In such cases problems may arise when feeding out material from the bed.

Figure 5D:
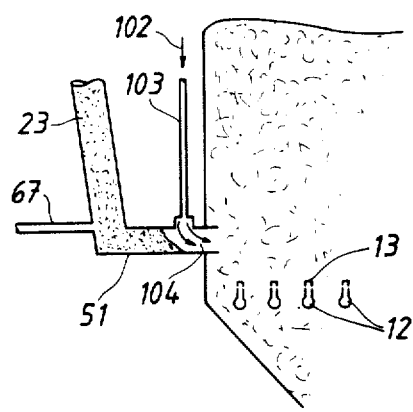

When the valve 31 is opened and a pressure reduction takes place in the storage container 21, a small amount of air and combustion gas will flow backwards through the L-valve 51 and up through the stationary material in the return feed conduit 23. Fuel particles present in the material will then be partly burnt out whereby a temperature increase is obtained, which may become so high that the material melts whereby a lump may be formed which may prevent a subsequent feedback to the combustion chamber 8. To prevent such a temperature increase, the conduit 23 can be provided with sufficiently good cooling, or a sufficient amount of inert gas can be supplied at the orifice of the L-valve, as shown in FIG. 5d. The inert gas 102 is supplied through the tube 103 to the orifice of the L-valve, where a sealing zone 104 of inert gas is formed. Gas sucked upwardly in the return feed conduit 23 will thereby be constituted by inert gas which prevents combustion.

The inert gas may, for example, consist of nitrogen gas, which is taken from a separate pressure gas source.

Another alternative in a PFBC plant with a steam generator is to utilize steam, which is inexpensive and practical since it will always be available when needed.

To limit the pressure difference between the storage container 21 and the space 11 in the pressure vessel 10, a valve 70 which opens at a certain pressure difference is located between the space 11 and the storage container 21. Said valve 70 may be positioned outside the pressure vessel 10 in a conduit 71.

I claim:

1. A power plant with a combustion chamber with a fluidized bed for combustion of fuel supplied to the bed and with means for adjusting the bed height by transferring bed material from the combustion chamber to a storage container and returning bed material from the storage container to the combustion chamber in which the storage container for bed material is connected to the combustion chamber by means of feed-out and return conduits in which the storage container is connected, via a conduit with a valve, to a space having a lower pressure than that in the combustion chamber, and in which the return conduit is connected, via a conduit with a valve, to a pressure gas source having a higher pressure than the pressure in the combustion chamber.

2. A power plant according to claim 1, in which the combustion chamber is enclosed in a pressure vessel pressurized by compressed combustion air (a so-called PFBC plant).

3. A power plant according to claim 2, in which the storage container is placed inside the pressure vessel.

4. A power plant according to claim 1 or 2, in which the outlet end of the feed-out conduit opens out into a dust separator above the storage container.

5. A power plant according to claim 1 or 2, in which the outlet end of the feed-out conduit opens out directly into the storage container, in the upper part thereof, and is substantially downwardly directed.

6. A power plant according to claim 5, in which the wall of the outlet end of the feed-out conduit includes a portion provided with openings at a distance from an outlet orifice.

7. A power plant according to claim 6, in which the outlet end of the feed-out conduit is provided with a sleeve placed concentrically around the portion with openings.

8. A power plant according to claim 1 or 2, in which the feed-out conduit at its inlet end in the bed is provided with a nozzle, which is connected to a pressure gas source through a conduit with a valve for control of the material flow in the feed-out conduit.

9. A power plant according to claim 2, in which the feed-out conduit at its inlet end in the bed is provided with a nozzle, which is connected to the pressure vessel through a conduit with a valve.

10. A power plant according to claim 1 or 2, in which the return conduit is connected, through a conduit with a valve, to a pressure gas source for transport gas.

11. A power plant according to claim 10, in which the return conduit includes a fluid valve of L-valve type, or the like, and in which the pressure gas source is connected to this fluid valve.

12. A power plant according to claim 2, in which the return conduit is connected to the pressure vessel through a conduit with a valve.

13. A power plant according to claim 12, in which the return conduit includes a material lock of L-valve type, or the like, and in which the pressure vessel is connected to said material lock.

14. A power plant according to claim 1 or 2, in which the storage container is provided with a heat insulation.

15. A power plant according to claim 14, in which the storage container is provided with a heating device.

16. A power plant according to claim 1 or 2, in which the conduit to a space having a lower pressure includes a pressure reduction device whereby combustion air is allowed to pass past the pressure reduction device in order thus to cool the transport gas.

17. A power plant according to claim 1 or 2, in which a number of storage containers, each one provided with feed-out and return conduits, are used for feeding out and returning bed material to and from the common combustion chamber.

18. A power plant according to claim 11, in which the L valve is provided with means for the supply of inert sealing gas.

19. A power plant according to claim 18, in which the sealing gas consists of water vapour.

* * * * *